(12) United States Patent
Ackermann et al.

(10) Patent No.: US 11,286,852 B2
(45) Date of Patent: Mar. 29, 2022

(54) GAS TURBINE ENGINE BUFFER SYSTEM

(71) Applicant: United Technologies Corporation, Farmington, CT (US)

(72) Inventors: William K. Ackermann, East Hartford, CT (US); Peter M. Munsell, Granby, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 469 days.

(21) Appl. No.: 16/568,525

(22) Filed: Sep. 12, 2019

(65) Prior Publication Data

US 2020/0141315 A1 May 7, 2020

Related U.S. Application Data

(63) Continuation of application No. 13/366,447, filed on Feb. 6, 2012, now Pat. No. 10,415,468.
(Continued)

(51) Int. Cl.
| | |
|---|---|
| *F02C 6/08* | (2006.01) |
| *F01D 25/12* | (2006.01) |
| *F02C 7/18* | (2006.01) |
| *F01D 11/04* | (2006.01) |
| *F01D 25/16* | (2006.01) |

(Continued)

(52) U.S. Cl.
CPC ............... *F02C 6/08* (2013.01); *F01D 11/04* (2013.01); *F01D 25/125* (2013.01); *F01D 25/16* (2013.01); *F02C 7/06* (2013.01); *F02C 7/185* (2013.01); *F02C 7/28* (2013.01); *F02C 9/18* (2013.01); *F05D 2260/202* (2013.01); *F05D 2260/213* (2013.01); *Y02T 50/60* (2013.01)

(58) Field of Classification Search
CPC .... F02C 6/08; F02C 7/06; F02C 7/185; F02C 7/28; F02C 7/36; F02C 9/18
See application file for complete search history.

(56) References Cited

U.S. PATENT DOCUMENTS

| | | |
|---|---|---|
| 2,258,792 A | 4/1941 | New |
| 2,584,899 A | 2/1952 | Roderick |

(Continued)

FOREIGN PATENT DOCUMENTS

| | | |
|---|---|---|
| EP | 0791383 | 8/1997 |
| EP | 1142850 | 10/2001 |

(Continued)

OTHER PUBLICATIONS

Supplementary European Search Report for European Patent Application No. 13774935.4 completed Aug. 12, 2015.

(Continued)

*Primary Examiner* — Steven M Sutherland
(74) *Attorney, Agent, or Firm* — Carlson, Gaskey & Olds, P.C.

(57) ABSTRACT

A gas turbine engine includes a buffer system that communicates a buffer cooling air to at least one bearing structure and at least one shaft of the gas turbine engine. The buffer system includes a first bleed air supply and a conditioning device that conditions the first bleed air supply to render the first buffer supply air at an acceptable temperature to pressurize the at least one bearing structure and cool the at least one shaft.

30 Claims, 5 Drawing Sheets

Related U.S. Application Data

(60) Provisional application No. 61/592,925, filed on Jan. 31, 2012.

(51) Int. Cl.
*F02C 7/06* (2006.01)
*F02C 7/28* (2006.01)
*F02C 9/18* (2006.01)

(56) References Cited

U.S. PATENT DOCUMENTS

| | | | |
|---|---|---|---|
| 2,636,665 A | 4/1953 | Lombard | |
| 2,936,655 A | 5/1960 | Peterson et al. | |
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,527,317 A | 9/1970 | Motsinger | |
| 3,664,612 A | 5/1972 | Skidmore et al. | |
| 3,747,343 A | 7/1973 | Rosen | |
| 3,754,484 A | 8/1973 | Roberts | |
| 3,765,623 A | 10/1973 | Donelson et al. | |
| 3,820,719 A | 6/1974 | Clark | |
| 3,843,277 A | 10/1974 | Ehrich | |
| 3,844,110 A | 10/1974 | Widlansky et al. | |
| 3,892,358 A | 7/1975 | Gisslen | |
| 3,925,979 A | 12/1975 | Ziegler | |
| 3,932,058 A | 1/1976 | Harner et al. | |
| 3,935,558 A | 1/1976 | Miller et al. | |
| 3,940,092 A | 2/1976 | Farris | |
| 3,988,889 A | 11/1976 | Chamay et al. | |
| 4,130,872 A | 12/1978 | Harloff | |
| 4,220,171 A | 9/1980 | Ruehr | |
| 4,240,250 A | 12/1980 | Harris | |
| 4,284,174 A | 8/1981 | Salvana et al. | |
| 4,289,360 A | 9/1981 | Zirin | |
| 4,478,551 A | 10/1984 | Honeycutt, Jr. et al. | |
| 4,497,172 A | 2/1985 | Smith | |
| 4,502,274 A | 3/1985 | Girault | |
| 4,574,584 A | 3/1986 | Hovan | |
| 4,576,547 A | 3/1986 | Weiner et al. | |
| 4,649,114 A | 3/1987 | Miltenburger et al. | |
| 4,653,267 A | 3/1987 | Brodell et al. | |
| 4,696,156 A | 9/1987 | Burr et al. | |
| 4,709,545 A | 12/1987 | Stevens et al. | |
| 4,722,357 A | 2/1988 | Wynosky | |
| 4,782,658 A | 11/1988 | Perry | |
| 4,863,354 A | 9/1989 | Asselin et al. | |
| 4,979,362 A | 12/1990 | Vershure, Jr. | |
| 5,058,617 A | 10/1991 | Stockman et al. | |
| 5,072,781 A | 12/1991 | Goodman | |
| 5,102,379 A | 4/1992 | Pagluica et al. | |
| 5,141,400 A | 8/1992 | Murphy et al. | |
| 5,305,616 A | 4/1994 | Coffinberry | |
| 5,311,734 A | 5/1994 | Pope et al. | |
| 5,317,877 A | 6/1994 | Stuart | |
| 5,361,580 A | 11/1994 | Ciokajlo et al. | |
| 5,433,674 A | 7/1995 | Sheridan et al. | |
| 5,447,411 A | 9/1995 | Curley et al. | |
| 5,466,198 A | 11/1995 | McKibbin et al. | |
| 5,472,313 A | 12/1995 | Quinones et al. | |
| 5,482,431 A | 1/1996 | Taylor | |
| 5,524,847 A | 6/1996 | Brodell et al. | |
| 5,573,378 A | 11/1996 | Barcza | |
| 5,586,860 A | 12/1996 | Bertrand et al. | |
| 5,634,767 A | 6/1997 | Dawson | |
| 5,677,060 A | 10/1997 | Terentieva et al. | |
| 5,685,158 A | 11/1997 | Lenahan et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,035,627 A | 3/2000 | Liu | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,516,618 B1 | 2/2003 | Bock | |
| 6,517,341 B1 | 2/2003 | Brun et al. | |
| 6,520,742 B1 | 2/2003 | Forrester et al. | |
| 6,550,253 B2 | 4/2003 | Mortzheim et al. | |
| 6,607,165 B1 | 8/2003 | Manteiga et al. | |
| 6,619,030 B1 * | 9/2003 | Seda | F02C 3/067 60/226.1 |
| 6,709,492 B1 | 3/2004 | Spadaccini et al. | |
| 6,732,502 B2 | 5/2004 | Seda et al. | |
| 6,814,541 B2 | 11/2004 | Evans et al. | |
| 6,883,303 B1 | 4/2005 | Seda | |
| 7,021,042 B2 | 4/2006 | Law | |
| 7,090,466 B2 | 8/2006 | Honkomp et al. | |
| 7,147,440 B2 | 12/2006 | Benjamin et al. | |
| 7,159,402 B2 | 1/2007 | Hein et al. | |
| 7,219,490 B2 | 1/2007 | Dev | |
| 7,287,384 B2 | 10/2007 | Fish et al. | |
| 7,328,580 B2 | 2/2008 | Lee et al. | |
| 7,374,403 B2 | 5/2008 | Decker et al. | |
| 7,377,098 B2 | 5/2008 | Walker et al. | |
| 7,448,221 B2 | 11/2008 | Suciu et al. | |
| 7,591,754 B2 | 9/2009 | Duong et al. | |
| 7,632,064 B2 | 12/2009 | Somanath | |
| 7,658,077 B2 | 2/2010 | Earith et al. | |
| 7,662,059 B2 | 2/2010 | McCune | |
| 7,806,651 B2 | 10/2010 | Kennepohl et al. | |
| 7,824,305 B2 | 11/2010 | Duong et al. | |
| 7,828,682 B2 | 11/2010 | Smook | |
| 7,926,260 B2 | 4/2011 | Sheridan et al. | |
| 7,997,868 B1 | 8/2011 | Liang et al. | |
| 8,061,657 B2 | 11/2011 | Rocklin et al. | |
| 8,205,432 B2 | 6/2012 | Sheridan | |
| 2003/0046938 A1 | 3/2003 | Mortzheim et al. | |
| 2006/0228206 A1 | 10/2006 | Decker et al. | |
| 2007/0220899 A1 | 9/2007 | Earith et al. | |
| 2008/0003096 A1 | 1/2008 | Kohli et al. | |
| 2008/0115503 A1 | 5/2008 | Vasquez et al. | |
| 2008/0116009 A1 | 5/2008 | Sheridan et al. | |
| 2008/0317588 A1 | 12/2008 | Grabowski et al. | |
| 2009/0056343 A1 | 3/2009 | Suciu et al. | |
| 2009/0097967 A1 | 4/2009 | Smith et al. | |
| 2009/0104020 A1 | 4/2009 | Roush et al. | |
| 2009/0314881 A1 | 12/2009 | Suciu et al. | |
| 2010/0092116 A1 | 4/2010 | Franconi | |
| 2010/0105516 A1 | 4/2010 | Sheridan et al. | |
| 2010/0148396 A1 | 6/2010 | Xie et al. | |
| 2010/0162683 A1 | 7/2010 | Grabowski et al. | |
| 2010/0164234 A1 | 7/2010 | Bowman et al. | |
| 2010/0170262 A1 | 7/2010 | Kaslusky et al. | |
| 2010/0212281 A1 | 8/2010 | Sheridan | |
| 2010/0218483 A1 | 9/2010 | Smith | |
| 2010/0236216 A1 | 9/2010 | Winter et al. | |
| 2010/0331139 A1 | 12/2010 | McCune | |
| 2011/0047959 A1 | 3/2011 | DiBenedetto | |
| 2011/0159797 A1 | 6/2011 | Beltman et al. | |
| 2011/0293423 A1 | 12/2011 | Bunker et al. | |
| 2012/0124964 A1 | 5/2012 | Hasel et al. | |

FOREIGN PATENT DOCUMENTS

| | | |
|---|---|---|
| GB | 1095129 | 12/1967 |
| GB | 1386481 | 3/1975 |
| GB | 1516041 | 6/1978 |
| GB | 2041090 | 9/1980 |
| GB | 2426792 | 12/2006 |
| WO | 2007038674 | 4/2007 |

OTHER PUBLICATIONS

Supplementary European Search Report for European Patent Application No. 13775763.9 completed Aug. 12, 2015.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

(56) References Cited

OTHER PUBLICATIONS

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-31.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill. pp. 87-153.

Cheryan, M. (1998). Ultrafiltration and microfiltration handbook. Lancaster, PA: Tecnomic Publishing Company, Inc. pp. 171-236.

Seader, J.D. and Henley, E.J. (1998). Separation process principles. New York, NY: John Wiley & Sons, Inc. pp. 122-126 and 764-771.

Spadaccini, L.J., and Huang, H. (2002). On-line fuel deoxygenation for coke suppression. ASME, Jun. 2002. pp. 1-7.

Darrah, S. (1987). Jet fuel deoxygenation. Interim Report for Period Mar. 1987-Jul. 1988. pp. 1-22.

Bucknell, R.L. (1973). Influence of fuels and lubricants on turbine engine design and performance, fuel and lubricant analyses. Final Technical Report, Mar. 1971-Mar. 1973. pp. 1-252.

Hazlett, R.N. (1991). Thermal oxidation stability of aviation turbine fuels. Philadelphia, PA: ASTM. pp. 1-163.

Taylor, W.F. (1974). Deposit formation from deoxygenated hydrocarbons. I. General features. Ind. Eng. Chem., Prod. Res. Develop., vol. 13(2). 1974. pp. 133-138.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review_pdf.

Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.

Edwards, T. and Zabarnick, S. (1993). Supercritical fuel deposition mechanisms. Ind. Eng. Chem. Res. vol. 32. 1993. pp. 3117-3122.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Technical Data. Teflon. WS Hampshire Inc. Retrieved from: http://catalog.wshampshire.com/Asset/psg_teflon_ptfe.pdf.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Edkins, D.P., Hirschkron, R., and Lee, R. (1972). TF34 turbofan quiet engine study. Final Report prepared for NASA. NASA-CR-120914. Jan. 1, 1972. pp. 1-99.

Waters, M.N. and Schairer, E.T. (1977). Analysis of turbofan propulsion system weight and dimensions. NASA Technical Memorandum. Jan. 1977. pp. 1-65.

Meyer, A.G. (1988). Transmission development of TEXTRON Lycoming's geared fan engine. Technical Paper. Oct. 1988. pp. 1-12.

Dudley, D.W., Ed. (1962). Gear handbook. New York, NY: McGraw-Hill. pp. 14-17 (TOC, Preface, and Index).

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times. Jul. 13, 2008. pp. C6.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Trembley, JR., H.F. (1977). Determination of effects of ambient conditions on aircraft engine emissions. ALF 502 combustor rig testing and engine verification test. Prepared for Environmental Protection Agency. Sep. 1977. pp. 1-256.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Drago, R.J. (1974). Heavy-lift helicopter brings up drive ideas. Power Transmission Design. Mar. 1987. pp. 1-15.

Krantz, T.L. (1990). Experimental and analytical evaluation of efficiency of helicopter planetary stage. NASA Technical Paper. Nov. 1990. pp. 1-19.

Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.

Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Gray, D.E. (1978). Energy efficient engine preliminary design and integration studies. Prepared for NASA. NASA CR-135396. Nov. 1978. pp. 1-366.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

(56) References Cited

OTHER PUBLICATIONS

Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
Datasheet. CF6-80C2 high-bypass turbofan engines. Retreived from https://geaviation.com/sites/default/files/datasheet-CF6-80C2.pdf.
Salemme, C.T. and Murphy, G.C. (1979). Metal spar/superhybrid shell composite fan blades. Prepared for NASA. NASA-CR-159594. Aug. 1979. pp. 1-127.
"Press release. The GE90 engine. Retreived from: https://www.geaviation.com/commercial/engines/ge90-engine;https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".
Datasheet. Genx™ high bypass turbofan engines. Retreived from: https://www.geaviation.com/sites/default/files/datasheet-genx.pdf.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 3-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30, pp. 1-67.
Declaration of Reza Abhari. In re U.S. Pat. No. 8,448,895. Executed Nov. 28, pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.

Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003 . . . p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide

(56) References Cited

OTHER PUBLICATIONS materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 355-360.
Bunker, R.S. (2005). A review of shaped hole turbine film-cooling technology. Journal of Heat Transfer vol. 127. Apr. 2005. pp. 441-453.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Mancuso, J.R. And Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1954). Handbook of practical gear design. Lancaster, PA: Technomic Publishing Company, Inc. pp. 3.96-3.102 and 8.12-8.18.
Dudley, D.W., Ed. (1962). Gear handbook. New York, NY: McGraw-Hill. pp. 3.14-3.18 and 12.7-12.21.
Dudley, D.W., Ed. (1994). Practical gear design. New York, NY: McGraw-Hill. pp. 119-124.
Product Brochure. Garrett TFE731. Allied Signal. Copyright 1987. pp. 1-24.
Honeywell Learjet 31 and 35/36 TFE731-2 to 2C Engine Upgrade Program. Sep. 2005. pp. 1-4.
Honeywell Sabreliner 65 TFE731-3 to -3D Engine Upgrade Program. Oct. 2005. pp. 1-4.
U.S. Department of Transportation: Federal Aviation Administration Type Certificate Data Sheet No. E6WE. Dated: May 9, 2000. p. 1-9.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Presented at the International Gas Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS Sep. 10-13, 2007. Berlin, Germany. pp. 1-12.
About GasTurb. Retrieved Jun. 26, 2018 from: http://gasturb.de/about-gasturb.html.
Kurzke, J. (2001). GasTurb 9: A program to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes—SolidWorks Corporation. pp. 1-156.
Macisaac, B. and Langston, R. (2011). Gas turbine propulsion systems. Chichester, West Sussex: John Wiley & Sons, Ltd. pp. 260-265.

Datasheet. CFM56-5B for the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amezketa, M., Iriarte, X., Ros, J., and Pintor, J. (2009). Dynamic model of a helical gear pair with backlash and angle0varying mesh stiffness. Multibody Dynamics 2009, Eccomas Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives. lexandria, VA: American Gear Manufacturers Association. pp. 1-48.
Daly, M. Ed. (2007). Jane's Aero-Engine. Issue Twenty-three. Mar. 2008. p. 707-712.
AGMA Standard (1999). Flexible couplings—Mass elastic properties and other characteristics. Alexandria, VA: American Gear Manufacturers Association. pp. 1-46.
Wikipedia. Stiffness. Retrieved Jun. 28, 2018 from: https://en.wikipedia.org/wiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Gray, D.E. and Gardner, W.B. (1983). Energy efficient engine program technology benefit/cost study—vol. 2. NASA CR-174766. Oct. 1983. pp. 1-118.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Howe, D.C., and Wnynosky, T.A. (1985). Energy efficient engine program advanced turbofan nacelle definition study. NASA-CR-174942. May 1985. pp. 1-60.

(56) References Cited

OTHER PUBLICATIONS

Howe, D.C., and Wnynosky, T.A. (1985). Energy efficient engine program advanced turbofan nacelle definition study. NASA-CR-174942. May 1985. University of Washington dated Dec. 13, 1990. pp. 1-14.

Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.

Mattingly, J.D. (1996). Elements of gas turbine propulsion. New York, New York: McGraw-Hill, Inc. pp. 1-18, 60-62, 223-234, 462-479, 517-520, 757-767, and 862-864.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-151.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modem Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed) (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, fith Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress Al-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

\* cited by examiner

GAS TURBINE ENGINE BUFFER SYSTEM

CROSS-REFERENCE TO RELATED APPLICATIONS

This application is a continuation of U.S. patent application Ser. No. 13/366,447 filed Feb. 6, 2012, which claims priority to U.S. Provisional Application No. 61/592,925 which was filed on Jan. 31, 2012.

BACKGROUND

This disclosure relates to a gas turbine engine, and more particularly to a buffer system that can provide buffer cooling air to cool portions of the gas turbine engine, including at least one shaft of the gas turbine engine.

Gas turbine engines typically include at least a compressor section, a combustor section and a turbine section. During operation, air is pressurized in the compressor section and is mixed with fuel and burned in the combustor section to generate hot combustion gases. The hot combustion gases are communicated through the turbine section which extracts energy from the hot combustion gases to power the compressor section and other gas turbine engine modes.

Gas turbine engines typically include shafts that support a plurality of airfoil supporting rotors of the compressor section and the turbine section. For example, in a two-spool turbofan engine, an inner shaft (i.e., a low speed shaft) and an outer shaft (i.e., a high speed shaft) can be incorporated. These shafts, in particular the inner shaft, can be exposed to relatively high torque loading and stresses that result from size limitations caused by the need for the shaft to traverse the rotor structure inboard of the radially inner disk bores.

SUMMARY

A gas turbine engine includes a buffer system that communicates a buffer cooling air to at least one bearing structure and at least one shaft of the gas turbine engine. The buffer system includes a first bleed air supply and a conditioning device that conditions the first bleed air supply to render the first buffer supply air at an acceptable temperature to pressurize the at least one bearing structure and cool the at least one shaft.

In a further embodiment of the foregoing gas turbine engine embodiment, the at least one shaft can be an inner shaft that interconnects a low pressure compressor and a low pressure turbine of the gas turbine engine.

In a further embodiment of either of the foregoing gas turbine engine embodiments, the at least one shaft can be an outer shaft that interconnects a high pressure and a high pressure turbine of the gas turbine engine.

In a further embodiment of any of the foregoing gas turbine engine embodiments, the at least one shaft can include an outer shaft that surrounds an inner shaft, and the buffer cooling air can be communicated between the inner shaft and the outer shaft.

In a further embodiment of any of the foregoing gas turbine engine embodiments, the outer shaft can include a tie shaft.

In a further embodiment of any of the foregoing gas turbine engine embodiments, the buffer cooling air can be communicated axially through an inner diameter of the at least one shaft.

In a further embodiment of any of the foregoing gas turbine engine embodiments, the buffer cooling air can be communicated axially along an outer diameter of the at least one shaft.

In a further embodiment of any of the foregoing gas turbine engine embodiments, the buffer system can include a second bleed air supply and a valve that selects between the first bleed air supply and the second bleed air supply to communicate the buffer cooling air.

In a further embodiment of any of the foregoing gas turbine engine embodiments, the buffer system can include a controller that selectively operates the conditioning device.

In another exemplary embodiment, a gas turbine engine includes a compressor section, a combustor in fluid communication with the compressor section, a turbine section in fluid communication with the combustor, at least one shaft that interconnects the portion of the compressor section and the turbine section, and a bearing structure that supports the at least one shaft. The bearing structure can include a bearing compartment. A buffer system can selectively communicate a buffer cooling air to the bearing structure and axially along the at least one shaft.

In a further embodiment of the foregoing gas turbine engine embodiment, the buffer system can include a first bleed air supply and a conditioning device that conditions the first bleed air supply to render the buffer cooling air.

In a further embodiment of either of the foregoing gas turbine engine embodiments, the buffer system can include a first bleed air supply, a second bleed air supply, a valve that selects between the first bleed air supply and the second bleed air supply, and a conditioning device that conditions either the first bleed air supply or the said second bleed air supply to render the buffer cooling air.

In a further embodiment of any of the foregoing gas turbine engine embodiments, the conditioning device can include either a heat exchanger or an ejector.

In a further embodiment of any of the foregoing gas turbine engine embodiments, the gas turbine engine can include a high bypass geared aircraft engine having a bypass ratio of greater than about six (6).

In a further embodiment of any of the foregoing gas turbine engine embodiments, the gas turbine engine includes a low fan pressure ratio of less than about 1.45.

In yet another exemplary embodiment, a method of cooling a portion of a gas turbine engine includes communicating a buffer cooling air to at least a bearing structure of the gas turbine engine to pressurize a bearing compartment of the at least one bearing structure. The buffer cooling air can also be communicated axially along at least a portion of at least one shaft of the gas turbine engine.

In a further embodiment of the foregoing method embodiment, the step of communicating the buffer cooling air axially along at least a portion of the at least one shaft can include communicating the buffer cooling air along an outer diameter of the at least one shaft.

In a further embodiment of either of the foregoing method embodiments, the step of communicating the buffer cooling air axially along at least a portion of the at least one shaft can include communicating the buffer cooling air through an inner diameter of the at least one shaft.

In a further embodiment of any of the foregoing method embodiments, the step of communicating the buffer cooling air axially along at least a portion of the at least one shaft can include communicating the buffer cooling air along each of an inner diameter and an outer diameter of the at least one shaft.

In a further embodiment of any of the foregoing method embodiments, a bleed air supply is cooled prior to communicating the buffer cooling air.

The various features and advantages of this disclosure will become apparent to those skilled in the art from the following detailed description. The drawings that accompany the detailed description can be briefly described as follows.

DETAILED DESCRIPTION

Figure 1:
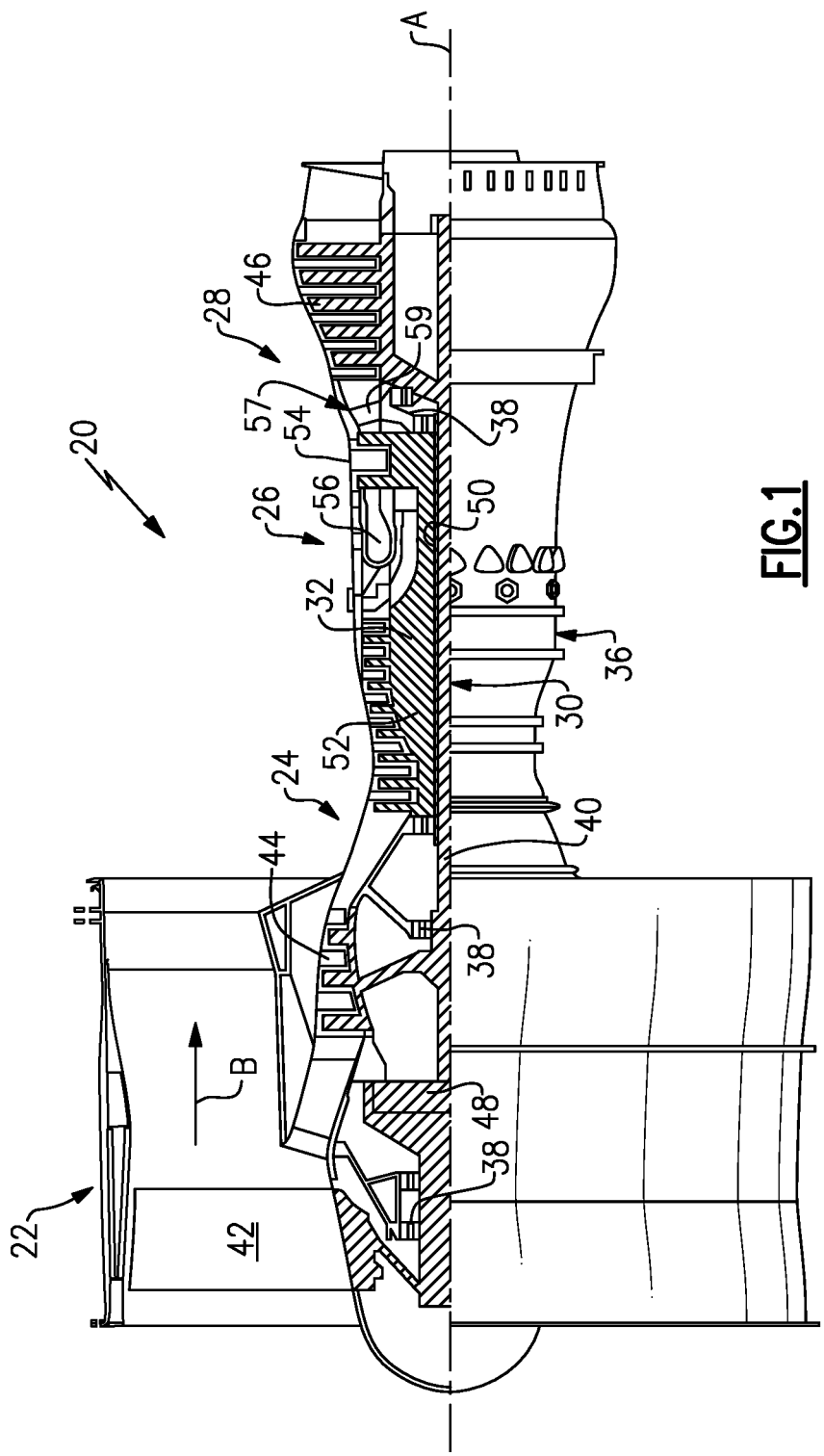
FIG. 1 is a cross-section of a gas turbine engine.

FIG. 1 is a cross-section of a gas turbine engine 20. The gas turbine engine 20 of this example is a two-spool turbofan engine that generally incorporates a fan section 22, a compressor section 24, a combustor section 26 and a turbine section 28. Alternative engines might include an augmenter section (not shown) among other systems or features. The fan section 22 drives air along a bypass flow path while the compressor section 24 drives air along a core flow path for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of turbine engines, including but not limited to three-spool engine architectures and land based engines.

The gas turbine engine 20 generally includes a low speed spool 30 and a high speed spool 32 mounted for rotation about an engine centerline longitudinal axis A relative to an engine static structure 36 via several bearing structures 38. It should be understood that various bearing structures 38 at various locations may alternatively or additionally be provided.

The low speed spool 30 generally includes an inner shaft 40 (i.e., a low shaft) that interconnects a fan 42, a low pressure compressor 44 and a low pressure turbine 46. The inner shaft 40 can be connected to the fan 42 through a geared architecture 48 to drive the fan 42 at a lower speed than the low speed spool 30. The high speed spool 32 includes an outer shaft 50 (i.e., a high shaft) that interconnects a high pressure compressor 52 and a high pressure turbine 54. In this example, the inner shaft 40 and the outer shaft 50 are supported at a plurality of axial locations by bearing structures 38 that are positioned within the engine static structure 36.

A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 can support one or more bearing structures 38 in the turbine section 28. The inner shaft 40 and the outer shaft 50 are concentric and rotate via the bearing structures 38 about the engine centerline longitudinal axis A, which is collinear with their longitudinal axes. The inner shaft 40 and the outer shaft 50 can be either co-rotating or counter-rotating with respect to one another.

The core airflow is compressed by the low pressure compressor 44 and the high pressure compressor 52, is mixed with fuel and burned in the combustor 56, and is then expanded over the high pressure turbine 54 and the low pressure turbine 46. The mid-turbine frame 57 includes airfoils 59 which are in the core airflow path. The high pressure turbine 54 and the low pressure turbine 46 rotationally drive the respective low speed spool 30 and the high speed spool 32 in response to the expansion.

In some non-limiting examples, the gas turbine engine 20 is a high-bypass geared aircraft engine. In a further example, the gas turbine engine 20 bypass ratio is greater than about six (6:1). The geared architecture 48 of the example gas turbine engine 20 includes an epicyclic gear train, such as a planetary gear system or other gear system. The example epicyclic gear train has a gear reduction ratio of greater than about 2.3. The geared architecture 48 enables operation of the low speed spool 30 at higher speeds which can increase the operational efficiency of the low pressure compressor 44 and low pressure turbine 46 and render increased pressure in a fewer number of stages.

The low pressure turbine 46 pressure ratio is pressure measured prior to inlet of low pressure turbine 46 as related to the pressure at the outlet of the low pressure turbine 46 of the gas turbine engine 20. In another non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about 5 (5:1). The geared architecture 48 of yet another embodiment is an epicyclic gear train with a gear reduction ratio of greater than about 2.5:1. It should be understood, however, that the above parameters are only exemplary of one embodiment of a geared architecture engine and that the present disclosure is applicable to other gas turbine engines including direct drive turbofans.

In this embodiment of the example gas turbine engine 20, a significant amount of thrust is provided by a bypass flow B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise. TSFC (Thrust Specific Fuel Consumption) is an industry standard parameter of fuel consumption per unit of thrust.

Fan Pressure Ratio is the pressure ratio across the fan section 22 without the use of a Fan Exit Guide Vane system. The low Fan Pressure Ratio according to one non-limiting embodiment of the example gas turbine engine 20 is less than 1.45.

Low Corrected Fan Tip Speed is the actual fan tip speed divided by an industry standard temperature correction of "T"/$518.7^{0.5}$. T represents the ambient temperature in degrees Rankine. The Low Corrected Fan Tip Speed according to one non-limiting embodiment of the example gas turbine engine 20 is less than about 1150 fps (351 m/s).

Figure 2:
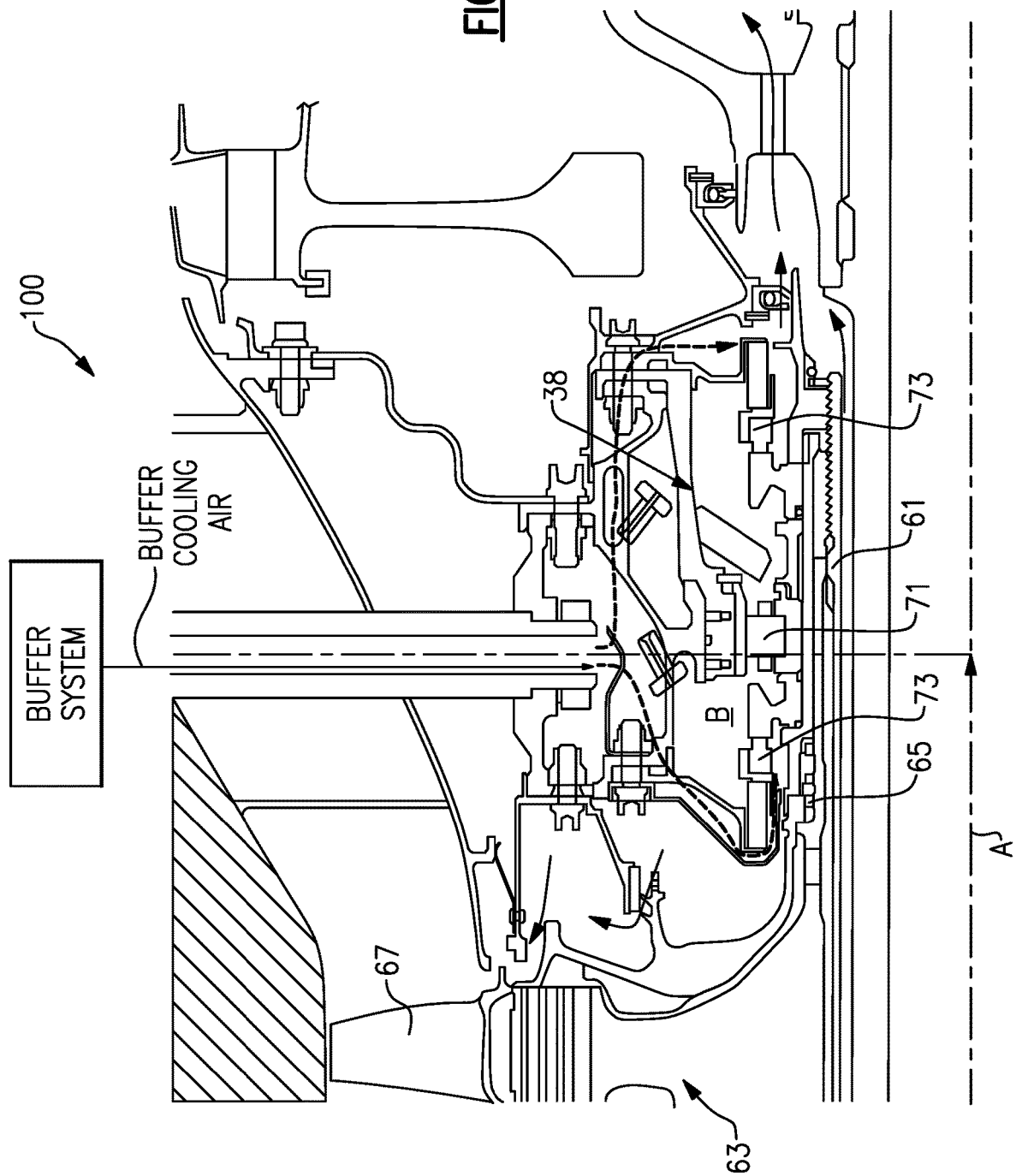
FIG. 2 is a schematic cross-section a gas turbine engine.

FIG. 2 illustrates a portion 100 of a gas turbine engine, such as the gas turbine engine 20. The portion 100 can include one or more bearing structures 38. Only one bearing structure 38 is depicted in FIG. 2 to schematically illustrate its features, but this is in no way intended to limit this disclosure.

The bearing structure 38 supports a shaft 61, such as the outer shaft 50, which supports a rotor assembly 63, such as a rotor assembly of the compressor section 24 or the turbine section 28, through a hub 65. In this example, the shaft 61 is a tie shaft that that connects the high pressure compressor 52 to the high pressure turbine 54. The rotor assembly 63 carries at least one airfoil 67 for adding or extracting energy from the core airflow.

The bearing structure 38 defines a bearing compartment B that houses one or more bearings 71. The bearing compartment B contains a lubricant for lubricating (and acting as a cooling medium to) the bearings 71. One or more seals 73 (two shown) contain the lubricant within the bearing compartment B. The seals 73 of the bearing compartment B must be pressurized to prevent the lubricant from leaking out during certain flight conditions, both steady state and transient. A buffer system can be used to communicate buffer supply air to the bearing compartment B in order to provide adequate pressurization of the seals 73 without exceeding material and/or lubricant temperature limitations. Example buffer systems that can be used for this and other purposes, including cooling at least one shaft, are detailed below.

Figure 3:
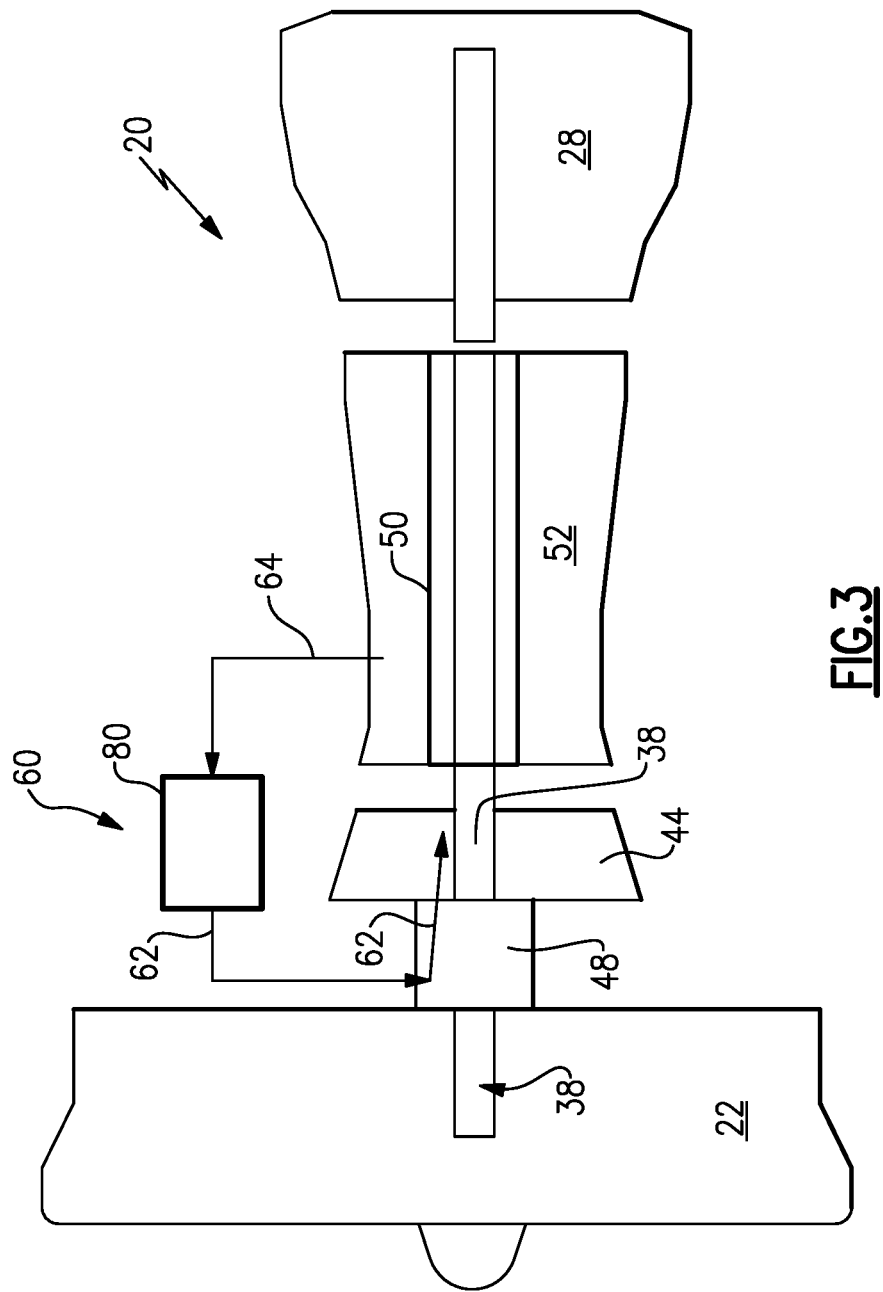
FIG. 3 is a schematic of an example buffer system of the gas turbine engine.

FIG. 3 illustrates an example buffer system 60 that can communicate a buffer cooling air 62 to a first portion of the gas turbine engine 20, such as one or more bearing structures 38 (shown schematically in FIG. 3) and a second portion of the gas turbine engine 20, such as to the inner shaft 40 (shown schematically in FIG. 4) of the gas turbine engine 20. The buffer cooling air 62 pressurizes the outside of the bearing compartment(s) of the bearing structure(s) 38 to maintain sufficient pressure differential between the buffer cavity and the inner bearing compartment cavity and maintain bearing compartment seal leakage inflow at an acceptable temperature. The buffer cooling air 62 can also be used to cool the inner shaft 40 (and optionally the outer shaft 50, see FIG. 1) to acceptable operating temperatures. By cooling the inner and outer shafts 40, 50 with the buffer cooling air 62, the inner and outer shafts 40, 50 can be manufactured using relatively low temperature capable materials rather than exotic, high cost, and difficult to manufacture alloys. Example low temperature capable materials include steel or stainless steel among other known materials.

The buffer system 60 of FIG. 3 may include a bleed air supply 64 and a conditioning device 80. The bleed air supply 64 may be sourced from the fan section 22, the low pressure compressor 44 or the high pressure compressor 52. In the illustrated non-limiting example, the bleed air supply 64 is sourced from a middle stage of the high pressure compressor 52. The conditioning device 80 can cool and/or otherwise condition the bleed air supply 64 to render a buffer cooling air 62 having an acceptable temperature for buffering the environment surrounding the bearing structures 38 and the inner shaft 40. The conditioning device 80 could include an air-to-air heat exchanger, a fuel-to-air heat exchanger, or any other suitable heater exchanger.

Figure 4:
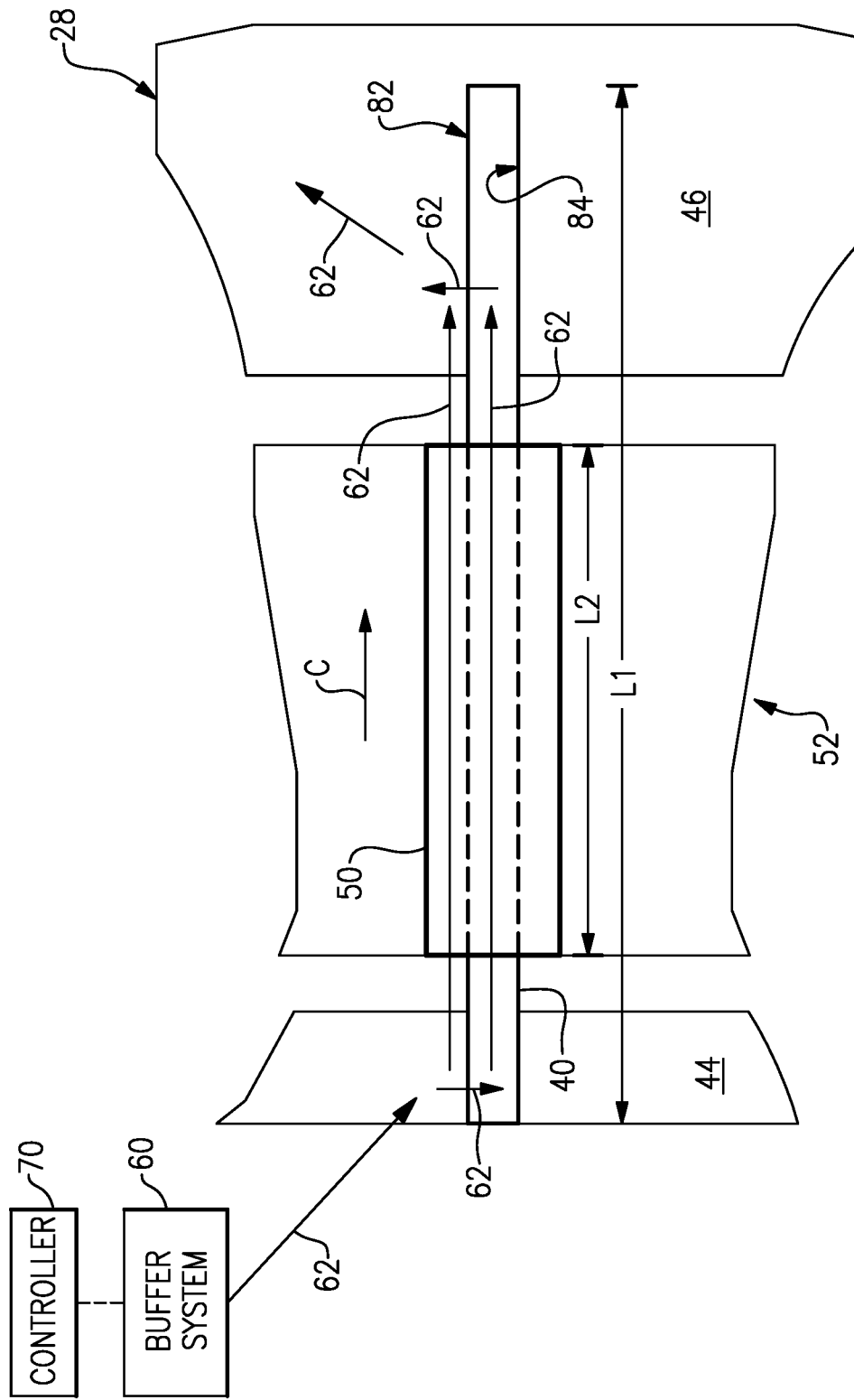
FIG. 4 illustrates additional aspects of the buffer system of FIG. 3.

Referring to FIG. 4, the buffer cooling air 62 may be communicated from the conditioning device 80 to a bearing structure 38, then axially along an outer diameter 82 of the inner shaft 40 (i.e., between the inner shaft 40 and the outer shaft 50), and then downstream to the turbine section 28 to cool other bearing structures or for turbine ventilation purposes. The outer shaft 50, which in this example is a tie shaft that interconnects the high pressure compressor 52 and the high pressure turbine 54, isolates the inner shaft 40 from potentially hotter compressor ventilation airflow C supplied from the same or different source. The compressor ventilation airflow C may be hotter than the inner shaft 40 as a result of heat transfer with the hardware of the compressor section 24.

The buffer cooling air 62 may also be simultaneously communicated axially along and through an inner diameter 84 of the inner shaft 40 where the inner shaft 40 is hollow. It should be understood that the buffer cooling air 62 may be communicated along the outer diameter 82, along the inner diameter 84, or both at the same time. The buffer cooling air 62 may condition the bearing structures 38 and the inner and outer shafts 40, 50 as it is communicated along this path. In this example, the buffer cooling air 62 is communicated substantially along an entire axial length L1 of the inner shaft 40 and an entire axial length L2 of the outer shaft 50. However, the buffer cooling air 62 could be communicated along only portions of the axial lengths L1, L2 depending on how and where the buffer cooling air 62 is piped to the inner shaft 40 and the outer shaft 50.

Although shown schematically, the buffer cooling air 62 is communicated between the conditioning device 80, the bearing structures 38 and the inner and outer shafts 40, 50 via buffer tubing, conduits, or other passageways. Such tubing, conduits and/or passageways could be routed throughout the gas turbine engine 20. The type, location and configuration of such tubing, conduits and/or passageways are not intended to limit this disclosure.

The buffer system 60 may also include a controller 70. The controller 70 can be programmed to selectively command the communication of buffer cooling air 62 during certain operating conditions. The controller 70 may also potentially generate a signal to command operation of the conditioning device 80 and/or a source-switching valve. Also, although shown as a separate feature, the controller functionality could be incorporated into the conditioning device 80. The buffer system 60 is operable to communicate buffer cooling air 162 for responding to any engine operating condition.

Figure 5:
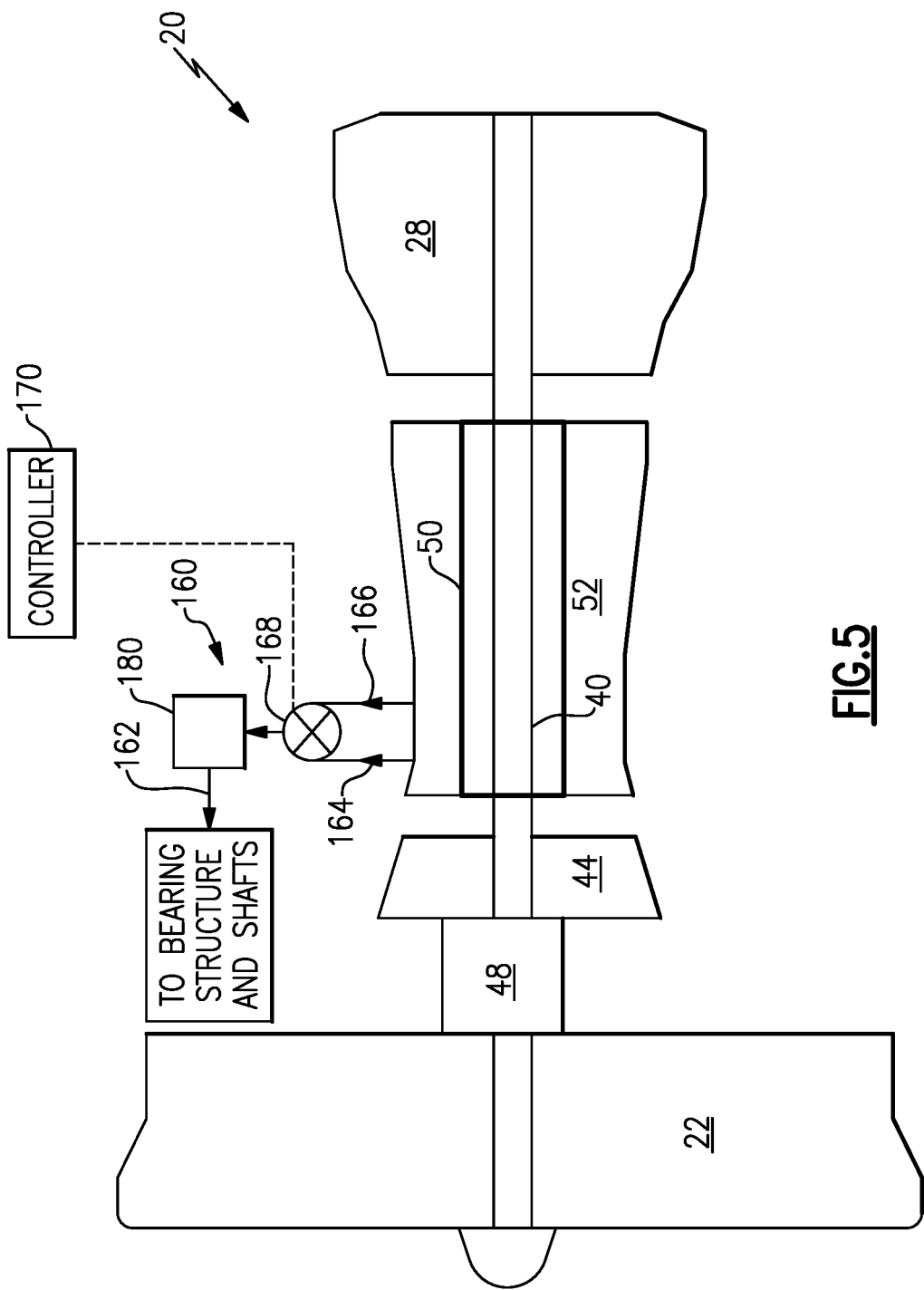
FIG. 5 is a schematic of another example of a buffer system.

FIG. 5 illustrates another example buffer system 160 that may be used to supply a buffer cooling air 162 to pressurize a bearing structure 38 and cool the inner and outer shafts 40, 50 of the gas turbine engine 20. In this example, the buffer system 160 is a multi-source buffer system that includes a first bleed air supply 164 and a second bleed air supply 166. In the exemplary embodiment, the first bleed air supply 164 is a low pressure bleed air supply and the second bleed air supply 166 is a high pressure bleed air supply that includes a pressure that is greater than the pressure of the first bleed air supply 164.

The first bleed air supply 164 may be sourced from the fan section 22, the low pressure compressor 44 or the high pressure compressor 52. In the illustrated non-limiting example, the first bleed air supply 164 is sourced from an upstream stage of the high pressure compressor 52. However, the first bleed air supply 164 could be sourced from any location that is upstream from the second bleed air supply 166. The second bleed air supply 166 may be sourced from the high pressure compressor 52, such as from a middle or downstream stage of the high pressure compressor 52. The second bleed air supply 166 could also be sourced from the low pressure compressor 44 or the fan section 22 depending on where the first bleed air supply 164 is sourced from.

The buffer system 160 may also include a valve 168 that is in communication with both the first bleed air supply 164 and the second bleed air supply 166. Although shown schematically, the first bleed air supply 164 and the second bleed air supply 166 can be in fluid communication with the valve 168 via buffer tubing, conduits, or other passageways.

In the exemplary embodiment, the valve 168 may select between the first bleed air supply 164 and the second bleed air supply 166 to communicate a buffer cooling air 162 having a desired temperature and pressure to desired portions of the gas turbine engine 20. The valve 168 communicates either the first bleed air supply 164 or the second bleed air supply 168 to a conditioning device 180 to cool the air supply and render the buffer cooling air 162.

The valve 168 can be a passive valve or a controller base valve. A passive valve operates like a pressure regulator that can switch between two or more sources without being commanded to do so by a controller, such as an engine control (EEC). The valve 168 of this example uses only a single input which is directly measured to switch between the first bleed air supply 164 and the second bleed air supply 661.

The valve 168 could also be a controller based valve. For example, the buffer system 160 could include a controller 170 in communication with the valve 168 for selecting between the first bleed air supply 164 and the second bleed air supply 166. The controller 170 is programmed with the necessary logic for selecting between the first bleed air supply 164 and the second bleed air supply 166 in response to detecting a pre-defined power condition of the gas turbine engine 20. The controller 170 could also be programmed with multiple inputs.

The determination of whether to communicate the first bleed air supply 164 or the second bleed air supply 166 as the buffer cooling air 162 is based on a power condition of the gas turbine engine 20. The term "power condition" as used in this disclosure generally refers to an operability condition of the gas turbine engine 20. Gas turbine engine power conditions can include low power conditions and high power conditions. Example low power conditions include, but are not limited to, ground operation, ground idle and descent idle. Example high power conditions include, but are not limited to, takeoff, climb, and cruise conditions. It should be understood that other power conditions are also contemplated as within the scope of this disclosure.

In one exemplary embodiment, the valve 168 communicates the first bleed air supply 164 (which is a relatively lower pressure bleed air supply) to the conditioning device 180 in response to identifying a high power condition of a gas turbine engine 20. The second bleed air supply 166 (which is a relatively higher pressure bleed air supply) is selected by the valve 168 and communicated to the conditioning device 180 in response to detecting a low power condition of the gas turbine engine 20. Both sources of bleed air are intended to maintain the same minimum pressure delta across the bearing compartment seals. Low power conditions require a higher pressure stage source to maintain adequate pressure differential, while high power conditions can meet requirements with a lower stage pressure source. Use of the lowest possible compressor stage can to meet the pressure requirements and minimize supply temperature and any negative performance impact to the gas turbine engine 20.

The conditioning device 180 of the buffer system 160 could include a heat exchanger or an ejector. An ejector adds pressure (using a small amount of the second bleed air supply 166) to the first bleed air supply 164 to prepare the buffer supply air 162.

Although the different examples have a specific component shown in the illustrations, embodiments of this disclosure are not limited to those particular combinations. It is possible to use some of the components or features from one of the examples in combination with features or components from another one of the examples.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A turbofan engine comprising:
   a fan section including a fan, an outer housing surrounding said fan to define a bypass duct, a fan pressure ratio of less than 1.45;
   a compressor section including a low pressure compressor and a high pressure compressor;
   a turbine section including a low pressure turbine and a high pressure turbine;
   an inner shaft that interconnects said low pressure compressor and said low pressure turbine;
   an outer shaft that interconnects said high pressure compressor and said high pressure turbine;
   a geared architecture that connects said fan section to said inner shaft to drive said fan at a lower speed than said low pressure turbine;
   a plurality of bearing structures including a first bearing structure supporting at least one of said inner shaft and said outer shaft, said first bearing structure including a bearing compartment; and
   a buffer system that prepares buffer air, communicates the buffer air to said first bearing structure to pressurize said bearing compartment and then from said first bearing structure axially along said inner shaft, and wherein said buffer system communicates the buffer air between said inner shaft and said outer shaft.

2. The turbofan engine as recited in claim 1, wherein said inner shaft and said outer shaft are concentric and are rotatable via said bearing structures about an engine centerline longitudinal axis.

3. The turbofan engine as recited in claim 2, wherein said buffer system communicates the buffer air from axially along said inner shaft downstream to said turbine section.

4. The turbofan engine as recited in claim 3, wherein said inner shaft is hollow, and said buffer system simultaneously communicates the buffer air along both an outer diameter and an inner diameter of said inner shaft.

5. The turbofan engine as recited in claim 4, wherein said buffer system includes a conditioning device that conditions a bleed air supply to render the buffer air.

6. The turbofan engine as recited in claim 5, wherein said plurality of bearing structures include a second bearing structure in said turbine section, and said buffer system communicates the buffer air from axially along said inner shaft downstream to said second bearing structure.

7. The turbofan engine as recited in claim 5, wherein said conditioning device includes a heat exchanger or an ejector.

8. The turbofan engine as recited in claim 1, wherein said geared architecture includes an epicyclic gear train.

9. The turbofan engine as recited in claim 8, further comprising a low corrected fan tip speed of less than 1150 fps.

10. The turbofan engine as recited in claim 9, wherein said buffer system communicates the buffer air from axially along said inner shaft downstream to said turbine section.

11. The turbofan engine as recited in claim 10, wherein said buffer system includes a conditioning device that conditions a first bleed air supply to render the buffer air, and said conditioning device includes a heat exchanger.

12. The turbofan engine as recited in claim 11, wherein the first bleed air supply is sourced from a stage of said high pressure compressor.

13. The turbofan engine as recited in claim 12, wherein said first bearing structure is axially forward of said high pressure compressor relative to said engine centerline longitudinal axis.

14. The turbofan engine as recited in claim 9, wherein said buffer system includes a conditioning device that conditions a bleed air supply to render the buffer air.

15. The turbofan engine as recited in claim 14, wherein said buffer system communicates the buffer air substantially along an entire axial length of said outer shaft.

16. The turbofan engine as recited in claim 15, wherein said inner shaft is hollow, and said buffer system simultaneously communicates the buffer air along both an outer diameter and an inner diameter of said inner shaft.

17. The turbofan engine as recited in claim 16, wherein said plurality of bearing structures include a second bearing structure in said turbine section, and said buffer system communicates the buffer air from axially along said inner shaft downstream to said second bearing structure.

18. The turbofan engine as recited in claim 9, wherein said buffer system includes a first bleed air supply, a second bleed air supply at a relatively higher pressure than the first bleed air supply, a valve that selects between the first bleed air supply and the second bleed air supply, and said buffer system includes a conditioning device that conditions one of the first bleed air supply and the second bleed air supply to render the buffer air.

19. The turbofan engine as recited in claim 18, wherein said buffer system includes a controller that communicates with said valve and is programmed to selectively command communication of the buffer air in response to a power condition of said turbofan engine, said power condition includes a low power condition and a high power condition, said valve communicates the first bleed air supply in response to said high power condition, and said valve communicates the second bleed air supply in response to said low power condition.

20. The turbofan engine as recited in claim 19, wherein the first and second bleed air supplies are sourced from different stages of said high pressure compressor.

21. The turbofan engine as recited in claim 20, wherein said buffer system includes a conditioning device, said valve communicates the first bleed air supply to said conditioning device in response to said high power condition to render the buffer air, and said valve communicates the second bleed air supply to said conditioning device in response to said low power condition to render the buffer air.

22. The turbofan engine as recited in claim 21, wherein said inner shaft is hollow, and wherein said buffer system communicates the buffer air between said inner shaft and said outer shaft and simultaneously communicates the buffer air along both an outer diameter and an inner diameter of said inner shaft.

23. The turbofan engine as recited in claim 22, wherein said buffer system communicates the buffer air substantially along an entire axial length of said inner shaft and substantially along an entire axial length of said outer shaft.

24. The turbofan engine as recited in claim 23, wherein said first bearing structure is axially forward of said high pressure compressor relative to said engine centerline longitudinal axis, said plurality of bearing structures include a second bearing structure in said turbine section, and said buffer system communicates the buffer air from axially along said inner shaft downstream to said second bearing structure.

25. The turbofan engine as recited in claim 24, wherein said turbine section includes a mid-turbine frame between said low pressure turbine and said high pressure turbine, said mid-turbine frame support one or more of said plurality of bearing structures, and said mid-turbine frame includes airfoils in a core airflow path.

26. A turbofan engine comprising:
a fan section including a fan, an outer housing surrounding said fan to define a bypass duct, a fan pressure ratio of less than 1.45;
a compressor section including a low pressure compressor and a high pressure compressor;
a turbine section including a low pressure turbine and a high pressure turbine;
an inner shaft that interconnects said low pressure compressor and said low pressure turbine;
an outer shaft that interconnects said high pressure compressor and said high pressure turbine;
a geared architecture that connects said fan section to said inner shaft to drive said fan at a lower speed than said low pressure turbine;
a plurality of bearing structures including a first bearing structure supporting at least one of said inner shaft and said outer shaft, said first bearing structure including a bearing compartment;
a buffer system that prepares buffer air, communicates the buffer air to said first bearing structure to pressurize said bearing compartment and then from said first bearing structure axially along said inner shaft;
wherein said inner shaft and said outer shaft are concentric and are rotatable via said bearing structures about an engine centerline longitudinal axis;
wherein said geared architecture includes an epicyclic gear train;
a low corrected fan tip speed of less than 1150 fps;
wherein said buffer system communicates the buffer air from axially along said inner shaft downstream to said turbine section; and
wherein said plurality of bearing structures include a second bearing structure in said turbine section, and said buffer system communicates the buffer air from axially along said inner shaft downstream to said second bearing structure.

27. The turbofan engine as recited in claim 26, wherein said buffer system communicates the buffer air between said inner shaft and said outer shaft.

28. The turbofan engine as recited in claim 26, wherein said first bearing structure is axially forward of said high pressure compressor relative to said engine centerline longitudinal axis.

29. The turbofan engine as recited in claim 28, wherein said buffer system communicates the buffer air between said inner shaft and said outer shaft.

30. The turbofan engine as recited in claim 29, wherein said buffer system communicates the buffer air to the geared architecture prior to communicating the buffer air to the first bearing structure.

* * * * *